United States Patent
Anvin

(10) Patent No.: US 7,330,959 B1
(45) Date of Patent: Feb. 12, 2008

(54) USE OF MTRR AND PAGE ATTRIBUTE TABLE TO SUPPORT MULTIPLE BYTE ORDER FORMATS IN A COMPUTER SYSTEM

(75) Inventor: H. Peter Anvin, San Jose, CA (US)

(73) Assignee: Transmeta Corporation, Santa Clara, CA (US)

( * ) Notice: Subject to any disclaimer, the term of this patent is extended or adjusted under 35 U.S.C. 154(b) by 379 days.

(21) Appl. No.: 10/830,921

(22) Filed: Apr. 23, 2004

(51) Int. Cl.
*G06F 12/00* (2006.01)
(52) U.S. Cl. .................. 711/206; 711/202; 711/203
(58) Field of Classification Search .............. 711/206
See application file for complete search history.

(56) References Cited

U.S. PATENT DOCUMENTS

| | | | | |
|---|---|---|---|---|
| 5,519,842 | A | * 5/1996 | Atallah et al. | 711/202 |
| 5,687,337 | A | 11/1997 | Carnevale et al. | 395/380 |
| 5,758,166 | A | * 5/1998 | Ajanovic | 710/240 |
| 5,781,763 | A | 7/1998 | Beukema et al. | 395/500 |
| 5,928,349 | A | 7/1999 | Loen et al. | 712/1 |
| 5,968,164 | A | 10/1999 | Loen et al. | 712/204 |
| 6,341,345 | B1 | 1/2002 | Auslander et al. | 712/204 |
| 2002/0069339 | A1 | 6/2002 | Lasserre et al. | 711/201 |

OTHER PUBLICATIONS

Undy, S.; Bass, M.; Hollenbeck, D.; Kever, W.; Thayer, L.; A low-cost graphics and multimedia workstation chip set; Micro, IEEE, vol. 14, Issue 2, Apr. 1994 pp. 10-22.*
Intel;IA-32 Architecture Software Developer's Manual; vol. 3: System Programming Guide; 1997-2007; Intel Corporation; P.O Box 5937, Denver, CO 802-9808; http://www.intel.com; 836 pages.

* cited by examiner

*Primary Examiner*—Brian R. Peugh
*Assistant Examiner*—Matthew Bradley

(57) ABSTRACT

Computer technology supports multiple byte order formats, separately or simultaneously. In one embodiment, a page attribute table (PAT), which is programmable, is utilized to indicate byte order format. The PAT has a plurality of entries. Each entry indicates a memory type and a byte order format for a physical address, wherein a plurality of attribute bits and a virtual address are associated with the physical address. A portion of the attribute bits are utilized to select one of the entries. In another embodiment, a memory type range register (MTRR), which is programmable, is utilized to indicate byte order format. The MTRR is configured to indicate a memory type and a byte order format for a range of physical addresses, wherein the memory type and range register (MTRR) receives a physical address and provides a corresponding memory type and a corresponding byte order format.

28 Claims, 7 Drawing Sheets

200

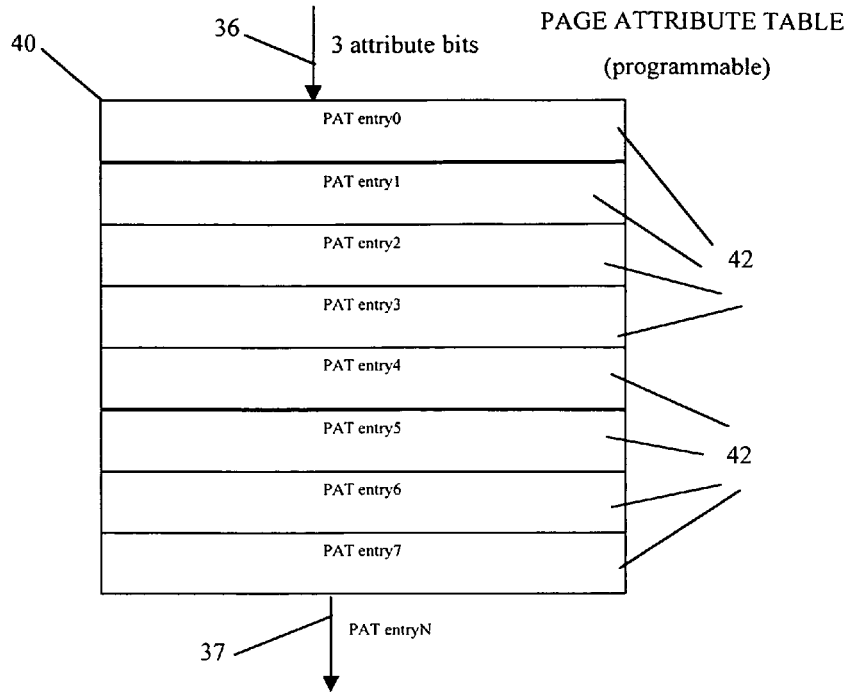

Figure 4A

AVAILABLE MEMORY TYPES AND
AVAILABLE BYTE ORDER FORMATS

WB-BE (BIGENDIAN)
WB-LE (LITTLEENDIAN)
WT-BE (BIGENDIAN)
WT-LE (LITTLEENDIAN)
WP-BE (BIGENDIAN)
WP-LE (LITTLEENDIAN)
WC-BE (BIGENDIAN)
WC-LE (LITTLEENDIAN)
UC-BE (BIGENDIAN)
UC-LE (LITTLEENDIAN)
UC⁻-BE (BIGENDIAN)
UC⁻-LE (LITTLEENDIAN)

Figure 4B

UTILIZED MEMORY TYPES AND
UTILIZED BYTE ORDER FORMATS

WB-BE (BIGENDIAN)
WB-LE (LITTLEENDIAN)
WT-BE (BIGENDIAN)
WT-LE (LITTLEENDIAN)
WC-BE (BIGENDIAN)
WC-LE (LITTLEENDIAN)
UC-BE (BIGENDIAN)
UC-LE (LITTLEENDIAN)

USE OF MTRR AND PAGE ATTRIBUTE TABLE TO SUPPORT MULTIPLE BYTE ORDER FORMATS IN A COMPUTER SYSTEM

BACKGROUND OF THE INVENTION

1. Field of the Invention

The present invention generally relates to byte order formats and systems. More particularly, the present invention relates to the field of supporting multiple byte order formats in a computer system.

2. Related Art

A byte is the smallest addressable unit of storage in a computer system. If a single datum is larger than a byte, it will need to be stored in a sequence of bytes. The system of interpretation of this sequence of bytes is referred to as the byte order format.

Generally, there are multiple types of byte order formats. The most widely used byte order formats are Most Significant Byte First, commonly referred to as bigendian, and Least Significant Byte First, commonly referred to as littleendian. Typically, a particular system (e.g., a computer system) is configured to use a particular byte order format (e.g., bigendian or littleendian). In a bigendian system, the most significant byte of a multi-byte datum is stored at the lowest memory address, the next most significant byte of the data is stored at the next higher address, and so on. Conversely, in a littleendian system, the least significant byte of a multi-byte datum is stored at the lowest memory address, the next least significant byte of the data is stored at the next higher address, and so on. Attempts to design systems capable of using multiple byte order formats (e.g., systems that can use either of the bigendian and littleendian formats, so called bi-endian systems) have led to complicated implementations that reduce system performance.

SUMMARY OF THE INVENTION

Method and system for supporting multiple byte order formats, separately or simultaneously, are provided and described. In one embodiment, a page attribute table (PAT), which is programmable, is utilized to indicate byte order format. In another embodiment, a memory type range register (MTRR), which is programmable, is utilized to indicate byte order format.

BRIEF DESCRIPTION OF THE DRAWINGS

The accompanying drawings, which are incorporated in and form a part of this specification, illustrate embodiments of the invention and, together with the description, serve to explain the principles of the present invention.

FIG. 4A illustrates in greater detail the page attribute table (PAT) of FIGS. 1 and 2 in accordance with an embodiment of the present invention.

FIG. 4B illustrates available memory types and available byte order formats for the entries of the page attribute table of FIG. 1 in accordance with an embodiment of the present invention.

FIG. 4C illustrates utilized memory types and utilized byte order formats from FIG. 4B for the entries of the page attribute table of FIG. 1 in accordance with an embodiment of the present invention.

DETAILED DESCRIPTION OF THE INVENTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details.

Although the description of the invention will focus on the bigendian format and the littleendian format, the description is equally applicable to other byte order formats.

Figure 1:
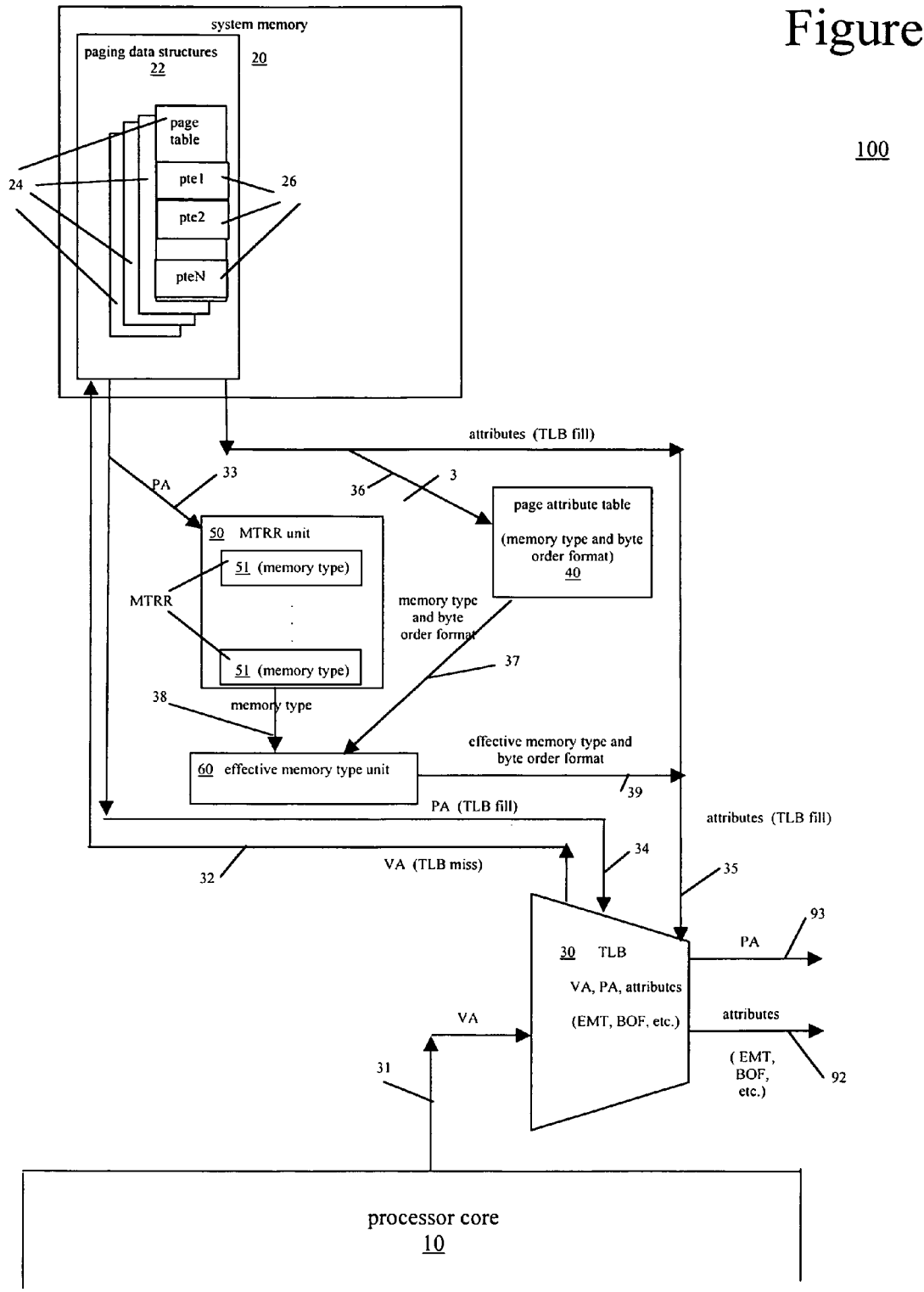
FIG. 1 illustrates a system in accordance with an embodiment of the present invention, whereas the system supports multiple byte order formats.

FIG. 1 illustrates a system 100 in accordance with an embodiment of the present invention, wherein the system 100 supports multiple byte order formats, separately or simultaneously. In an embodiment, the system 100 supports concurrent use of the bigendian format and the littleendian format. Rather than incorporating specialized components and specialized signals for handling byte order formats, the system 100 emphasizes compatibility with existing architectures (e.g., the x86 architecture and its variants and derivatives).

As depicted in FIG. 1, the system 100 includes a processor core 10, a system memory 20, and a translation lookaside buffer (TLB) 30. Moreover, the system 100 further has a page attribute table 40, a memory type and range register (MTRR) unit 50, and an effective memory type unit 60. In an embodiment, the system 100 is a computer system.

The system memory 20 includes paging data structures 22. The paging data structures 22 include a plurality of page tables 24. Each page table 24 has a plurality of page table entries 26. When the paging data structures 22 receive a virtual address (VA) via line 32, the paging data structures 22 translate the virtual address (VA) to a physical address (PA) and provide the physical address (PA) via line 34. Moreover, the paging data structures 22 provide attribute bits via line 35, wherein the attribute bits are associated with the provided physical address (PA). These attribute bits specify such attributes as read-only, user-supervisor privileges, cache policy, etc. It should be understood that the address translation can also be performed by hash tables or a software algorithm. A data read operation or a data write operation can be performed in the physical address space using the physical address (PA) provided via line 34.

The translation lookaside buffer (TLB) 30 caches address translations (e.g., virtual address (VA) to physical address (PA)) and attributes associated with the physical address. This increases system performance. Typically, the processor core 10 provides a virtual address (VA) via line 31 to the TLB 30. If there is a TLB hit (meaning that the TLB 30 has the required address translation), the TLB 30 provides the corresponding physical address (PA) via line 93 and the corresponding attributes via line 92. However, if there is a TLB miss (meaning that the TLB 30 does not have the required address translation), the TLB fill operation is performed. The received virtual address (VA) is sent to the memory system 20 via line 32 to obtain the address translation and attributes via lines 34 and 35, respectively, from the memory system 20. As will be described below, the attributes cached by the TLB 30 include the effective memory type (EMT) and the byte order format (BOF) for the physical address (PA).

Figure 5:
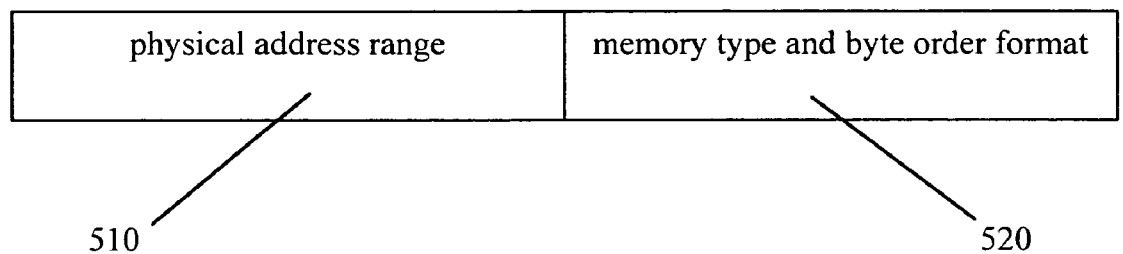
FIG. 5 illustrates in greater detail a format for a memory type range register (MTRR) of FIG. 2 in accordance with an embodiment of the present invention.

As shown in FIG. 1, the MTRR unit 50 includes a plurality of memory type and range registers (MTRRs) 51. Each MTRR 51 enables the memory type to be specified for various physical address ranges, allowing memory accesses to be optimized for various types of memory such as RAM, ROM, frame buffer memory, memory-mapped I/O devices, etc. The MTRR unit 50 may have several types of MTRRs 51. As an example, one type of MTRR 51 can set the default memory type for various regions of the physical address space. Moreover, another type of MTRR 51 can set the memory type for fixed physical address ranges. FIG. 5 (discussed in connection with FIG. 2) illustrates a format of one type of MTRR 51 in accordance with an embodiment of the present invention. Other types of MTRRs may have different formats.

The effective memory type (EMT) and the byte order format (BOF) are determined by the page attribute table 40, a memory type and range register (MTRR) 51, and the effective memory type unit 60. In particular, a portion of the attribute bits of line 35 is utilized as an index to the page attribute table 40, which is programmable. In an embodiment, three bits of the attribute bits of line 35 are used via line 36 to index an entry of the page attribute table 40 to select a page-level memory type and a byte order format for the corresponding physical address (PA) of line 34. The memory type and the byte order format are provided via the line 37 from the page attribute table 40. The memory type is the type of caching (or no caching) specified for the corresponding physical address (PA) of line 34. In an embodiment, the byte order format is bigendian or littleendian for the corresponding physical address (PA) of line 34. In general, the operating system of the system 100 programs the page attribute table 40.

There are many techniques that can be utilized for indicating in each entry of the page attribute table 40 the memory type and the byte order format. In one implementation, a first encoding is used for indicating memory type while a second encoding is used for indicating the byte order format. For example, if a particular bit is 0, the byte order format is littleendian. However, if the particular bit is 1, the byte order format is bigendian. Moreover, a code having several bits can indicate the memory type. In another implementation, a single encoding is used to indicate both the memory type and the byte order format.

As shown in FIG. 1, the MTRR unit 50 receives the physical address (PA) via line 33 and provides the PA range-level memory type from a MTRR 51 via line 38. Commonly, the MTRR unit 50 is programmed by software initialization code or BIOS rather than the operating system of the system 100.

Continuing, the effective memory type unit 60 receives the PA range-level memory type via line 38 from the MTRR unit 50 and receives the page-level memory type and the byte order format via the line 37 from the page attribute table 40. Moreover, the effective memory type unit 60 utilizes several precedence rules to determine the effective memory type of the physical address (PA) of line 34. For example, if the PA range-level memory type indicates the physical address (PA) is uncacheable, the page-level memory type cannot be used to enable caching for the physical address. Thus, the effective memory type is uncacheable (UC). Conversely, if the page-level memory type indicates the physical address (PA) is uncacheable (UC), the PA range-level memory type cannot be used to enable caching for the physical address. Further, the effective memory type unit 60 provides the effective memory type and the byte order format via the line 39, wherein the TLB 30 receives the attribute bits provided by the paging data structures 22, the effective memory type (EMT), and the byte order format (BOF) via the line 35.

Figure 2:
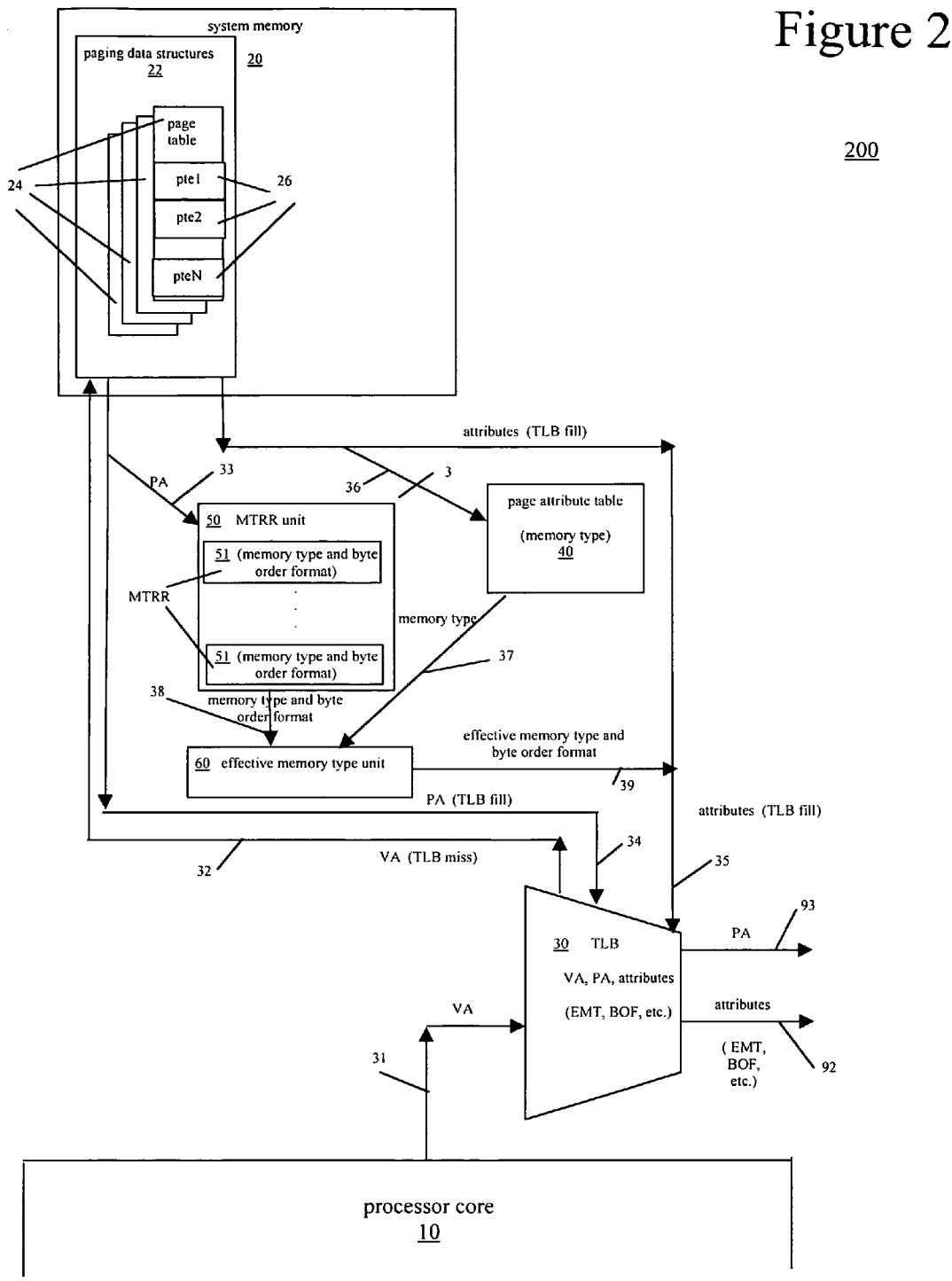
FIG. 2 illustrates a system in accordance with another embodiment of the present invention, whereas the system supports multiple byte order formats.

FIG. 2 illustrates a system 200 in accordance with another embodiment of the present invention, wherein the system 200 supports multiple byte order formats, separately or simultaneously. The discussion with respect to FIG. 1 is applicable to FIG. 2 except as noted below. In an embodiment, the system 200 is a computer system.

While the effective memory type (EMT) and the byte order format (BOF) continue to be determined by the page attribute table 40, a memory type and range register (MTRR) 51, and the effective memory type unit 60, this determination is made in a different manner compared to that described with respect to FIG. 1. In particular, while three bits of the attribute bits of line 35 are utilized to index an entry of the page attribute table 40 (which is programmable), the entry of the page attribute table 40 indicates a page-level memory type for the corresponding physical address (PA) of line 34 rather than a page-level memory type and a byte order format for the corresponding physical address (PA) of line 34. The memory type is provided via the line 37 from the page attribute table 40. As discussed above, the memory type is the type of caching (or no caching) specified for the corresponding physical address (PA) of line 34. In general, the operating system of the system 100 programs the page attribute table 40.

Unlike the MTRR unit of FIG. 1, the MTRR unit 50 of FIG. 2 includes MTRRs 51 that enable a byte order format as well as a memory type to be specified for various physical address ranges, allowing memory accesses to be optimized for various types of memory such as RAM, ROM, frame buffer memory, memory-mapped I/O devices, etc. As shown in FIG. 2, the MTRR unit 50 receives the physical address (PA) via line 33 and provides the PA range-level memory type and the byte order format from a MTRR 51 via line 38. In an embodiment, the byte order format is bigendian or littleendian for the received physical address (PA) of line 33. Commonly, the MTRR unit 50 is programmed by software initialization code or BIOS. However, the operating system of the system 100 can be configured to program the MTRR unit 50.

There are many techniques that can be utilized for indicating in the MTRR 51 the memory type and the byte order format. In one implementation, a first encoding is used for indicating memory type while a second encoding is used for indicating the byte order format. For example, if a particular bit is 0, the byte order format is littleendian. However, if the particular bit is 1, the byte order format is bigendian. Moreover, a code having several bits can indicate the memory type. In another implementation, a single encoding is used to indicate both the memory type and the byte order format.

Continuing, the effective memory type unit 60 receives the PA range-level memory type and byte order format via line 38 from the MTRR unit 50 and receives the page-level memory type via the line 37 from the page attribute table 40. As described above, the effective memory type unit 60 utilizes several precedence rules to determine the effective memory type of the physical address (PA) of line 34. For example, if the PA range-level memory type indicates the physical address (PA) is uncacheable, the page-level memory type cannot be used to enable caching for the physical address. Thus, the effective memory type is uncacheable (UC). Conversely, if the page-level memory type indicates the physical address (PA) is uncacheable (UC), the PA range-level memory type cannot be used to enable caching for the physical address. Further, the effective memory type unit 60 provides the effective memory type and the byte order format via the line 39, wherein the TLB 30 receives the attribute bits provided by the paging data structures 22, the effective memory type (EMT) and the byte order format (BOF) via the line 35.

Figure 3:
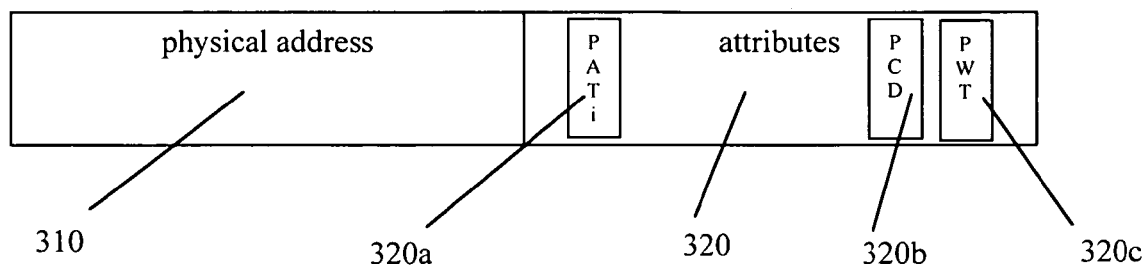
FIG. 3 illustrates a page table entry of FIGS. 1 and 2 in accordance with an embodiment of the present invention.

FIG. 3 illustrates a page table entry 26 of FIGS. 1 and 2 in accordance with an embodiment of the present invention. As depicted in FIG. 3, the page table entry 26 has a first portion 310 for the physical address and a second portion 320 for the attribute bits. In an embodiment, the attribute bits include a PATi (page attribute table index) bit 320a, a PCD (page-level cache disable) bit 320b, and a PWT (page-level write-through) bit 320c. The PATi bit 320a, the PCD bit 320b, and the PWT bit 320c are utilized to index the page attribute table 40 of FIGS. 1 and 2. It should be understood that other bits can be configured to index the page attribute table 40.

For compatibility with legacy processors, the page attribute table 40 can be programmed so that the PATi bit 320a has no effect, the PCD bit 320b controls the caching of individual pages or page tables, and the PWT bit 320c controls write-through or write-back caching policy of individual pages or page tables. If migrating from such a configuration, the system software may choose, by programming the page attribute table 40 appropriately, to utilize the PATi bit 320a to control the byte order format.

FIG. 4A illustrates in greater detail the page attribute table (PAT) 40 of FIGS. 1 and 2 in accordance with an embodiment of the present invention. As depicted in FIG. 4A, the page attribute table 40 includes a plurality of entries 42. In an embodiment, the page attribute table 40 has eight entries 42. Three attribute bits (received via line 36) are utilized to index the page attribute table 40 to select one of the entries 42 (output via line 37). While entries of the page attribute table 40 of FIG. 1 indicate a memory type and a byte order format, entries of the page attribute table 40 of FIG. 2 indicate only a memory type.

In an embodiment, the memory type (as specified in the entries of page attribute table 40 of FIGS. 1 and 2 and as specified in the MTRRs 51 of FIGS. 1 and 2) can be strong uncacheable (UC), write combining (WC), write-through (WT), write-back (WB), or write protected (WP). Additionally, the memory type (as specified in page attribute table 40 of FIGS. 1 and 2) can be weak uncacheable (UC–).

The strong uncacheable (UC) memory type indicates system memory locations (identified by physical addresses) are not cached. Weak uncacheable (UC–) memory type has similar characteristics as strong uncacheable (UC), however this memory type can be overridden by programming the MTRRs 51 of FIGS. 1 and 2 for the write combining (WC) memory type. The write combining (WC) memory type indicates system memory locations (identified by physical addresses) are not cached (as with the strong uncacheable (UC) memory type), but writes may be delayed and combined in the write combining buffer to reduce memory accesses.

The write-through (WT) memory type indicates writes and reads to and from the system memory are cached. Moreover, reads come from cache lines on cache hits; read misses cause cache fills from system memory 20. Further, all writes are written to a cache line (when possible) and through to system memory. When writing through to system memory, invalid cache lines are never filled, and valid cache lines are either filled or invalidated.

Continuing, the write-back (WB) memory type indicates writes and reads to and from system memory are cached. Reads come from cache lines on cache hits; read misses cause cache fills from system memory 20. Moreover, write misses cause cache line fills from system memory 20, and writes are performed entirely in the cache, when possible.

Finally, the write protected (WP) memory type indicates reads come from cache lines when possible, and read misses cause cache fills from system memory 20. Writes are propagated to a system data bus and cause corresponding cache lines on all processors on the system bus to be invalidated.

FIG. 4B illustrates available memory types and available byte order formats for the entries of the page attribute table 40 of FIG. 1 in accordance with an embodiment of the present invention. As shown in FIG. 4B, since there are six memory types described above and since there are two byte order formats (littleendian and bigendian), there are twelve combinations available for the entries of the page attribute table 40 of FIG. 1. As an example, the notation WB-BE indicates that the memory type is write-back (WB) while the byte order format is bigendian. In contrast, the entries of the page attribute table 40 of FIG. 2 can have only one of the six memory types described above.

Since the page attribute table 40 of FIG. 1 has eight entries (described and shown in FIG. 4A), no more than eight of the twelve combinations shown in FIG. 4B can be utilized and programmed into the page attribute table 40 of FIG. 1 at one time. Since the page attribute table 40 of FIG. 1 is programmable, the selected eight permutations can be dynamically changed.

In general, the write-back (WB) memory type, the write combining (WC) memory type, and the strong uncacheable (UC) memory type are widely utilized. Thus, FIG. 4C illustrates an exemplary list of utilized memory types and utilized byte order formats from FIG. 4B for the entries of the page attribute table 40 of FIG. 1 in accordance with an embodiment of the present invention.

Referring to FIG. 5, a format for a memory type range register (MTRR) 51 of FIG. 2 is illustrated in greater detail in accordance with an embodiment of the present invention. As depicted in FIG. 5, the MTRR 51 has a first portion 510 for the physical address range and a second portion 520 for the memory type and the byte order format. The second portion 520 can be any one of the twelve combinations listed in FIG. 4B. It should be understood that the MTRR 51 can be configured in other ways, and that other types of MTRRs may exist within the MTRR unit 50.

Figure 6:
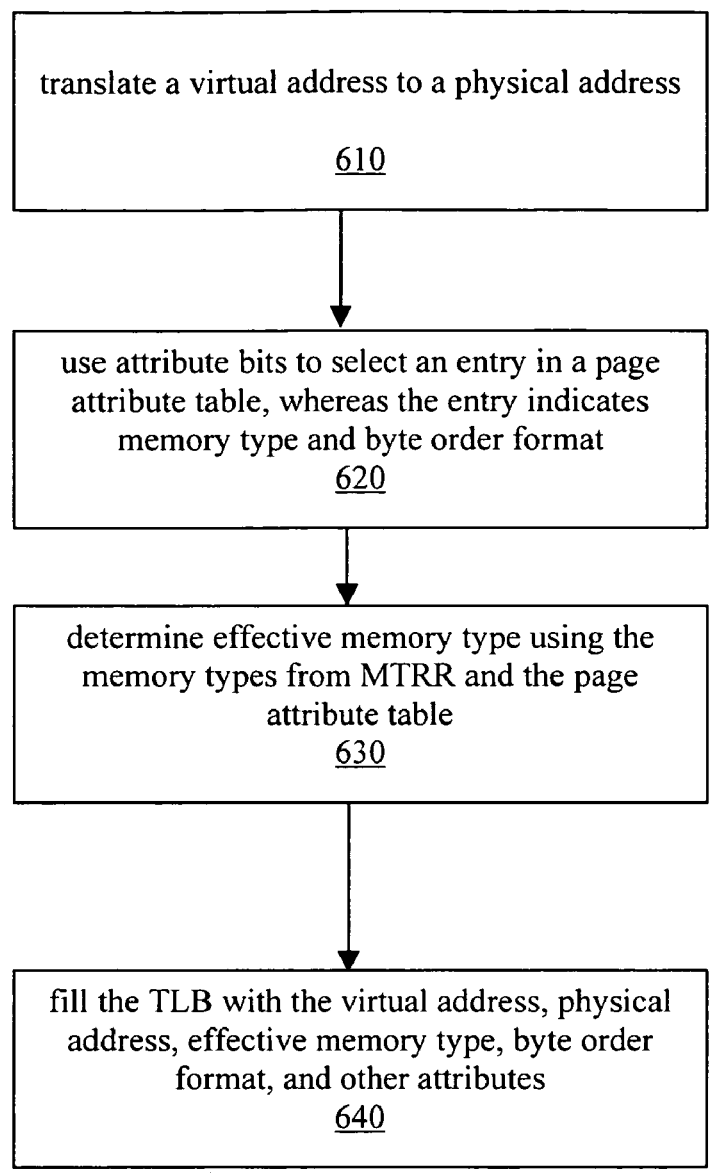
FIG. 6 illustrates a flow chart showing a method of filling a translation lookaside buffer (TLB) of FIG. 1 in accordance with an embodiment of the present invention.

FIG. 6 illustrates a flow chart showing a method 600 of filling a translation lookaside buffer (TLB) 30 of FIG. 1 in accordance with an embodiment of the present invention. Typically, a TLB miss causes a TLB fill per this algorithm.

At Step 610, a virtual address is translated to a physical address. Paging data structures 22 such as page tables 26 can be utilized for the address translation. A plurality of attribute bits is associated with the physical address.

Continuing at Step 620, several attribute bits are used to index the page attribute table 40 to select an entry of the page attribute table 40, wherein the entry indicates a memory type and a byte order format for the physical address. Additionally, the physical address is used to obtain the memory type from a MTRR 51 of the MTRR unit 50.

Furthermore, at Step 630, the effective memory type is determined by the effective memory type unit 60 using the memory types from the MTRR 51 and the page attribute table 40.

At Step 640, the TLB 30 is filled with the virtual address, the physical address, the effective memory type (EMT), the byte order format (BOF), and other attributes.

Figure 7:
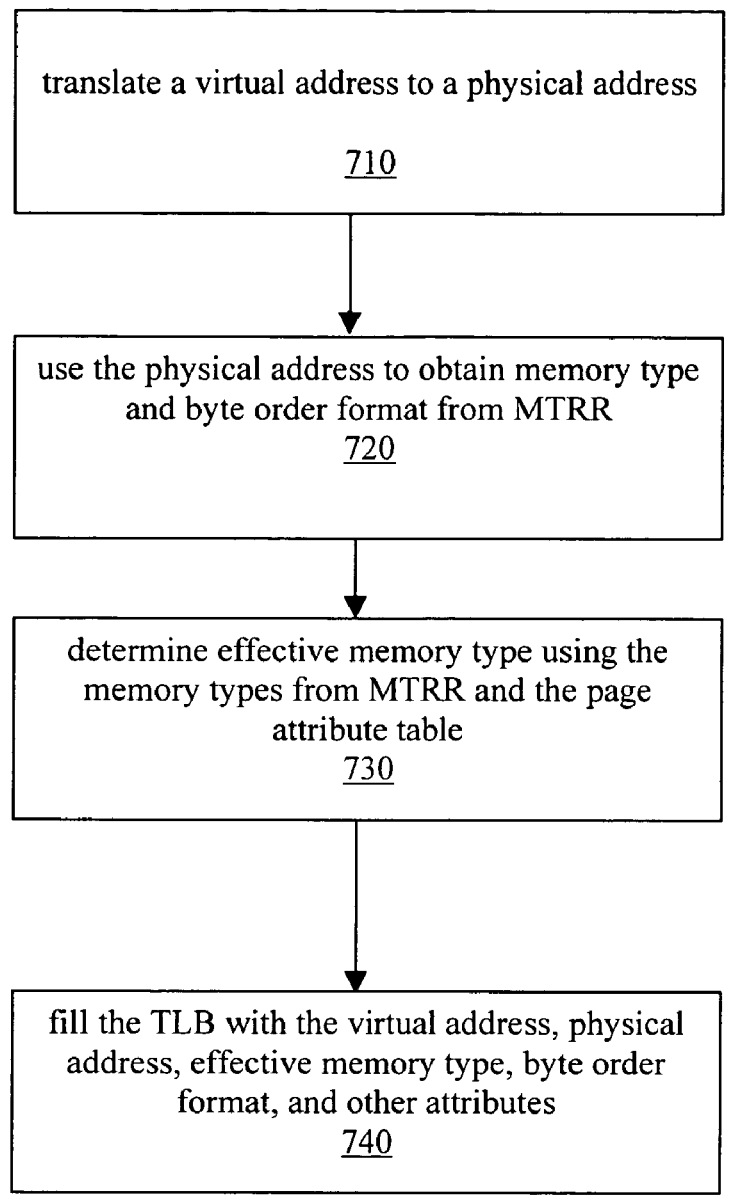
FIG. 7 illustrates a flow chart showing a method of filling a translation lookaside buffer (TLB) of FIG. 2 in accordance with an embodiment of the present invention.

FIG. 7 illustrates a flow chart showing a method 700 of filling a translation lookaside buffer (TLB) 30 of FIG. 2 in accordance with an embodiment of the present invention. Typically, a TLB miss causes a TLB fill per this algorithm.

At Step 710, a virtual address is translated to a physical address. Paging data structures 22 such as page tables 26 can be utilized for the address translation. A plurality of attribute bits is associated with the physical address.

Continuing, at Step 720, the physical address is used to obtain the memory type and byte order format from a MTRR 51 of the MTRR unit 50. Moreover, several attribute bits are used to index the page attribute table 40 to select an entry of the page attribute table 40, wherein the entry indicates a memory type for the physical address.

At Step 730, the effective memory type is determined by the effective memory type unit 60 using the memory types from the MTRR 51 and the page attribute table 40.

Furthermore, at Step 740, the TLB 30 is filled with the virtual address, the physical address, the effective memory type (EMT), the byte order format (BOF), and other attributes.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus comprising:
a page attribute table having a plurality of entries, wherein each entry indicates a memory type and a byte order format for a physical address, wherein a plurality of attribute bits and a virtual address are associated with said physical address, and wherein a portion of said attribute bits are utilized to select one of said entries.

2. The apparatus as recited in claim 1 wherein said page attribute table is programmable.

3. The apparatus as recited in claim 1 wherein said byte order format is either a bigendian format or a littleendian format.

4. The apparatus as recited in claim 1 wherein said portion of said attribute bits includes a first bit, a second bit, and a third bit.

5. The apparatus as recited in claim 4 wherein said first bit is a PATi (page attribute table index) bit, wherein said second bit is a PCD (page-level cache disable) bit, and wherein said third bit is a PWT (page-level write-through) bit.

6. An apparatus comprising:
a memory type and range register (MTRR) configured to indicate a memory type and a byte order format for a range of physical addresses, wherein said memory type and range register (MTRR) receives a physical address and provides a corresponding memory type and a corresponding byte order format.

7. The apparatus as recited in claim 6 wherein said memory type and range register (MTRR) is programmable.

8. The apparatus as recited in claim 6 wherein said byte order format is either a bigendian format or a littleendian format.

9. A system comprising:
a page attribute table having a plurality of entries, wherein each entry indicates a memory type and a byte order format for a physical address, wherein a plurality of attribute bits and a virtual address are associated with said physical address, and wherein a portion of said attribute bits are utilized to select one of said entries; and
a translation lookaside buffer (TLB) having a plurality of entries, wherein each entry includes a corresponding virtual address, a corresponding physical address, and a corresponding byte order format selected from said page attribute table, wherein said translation lookaside buffer (TLB) receives a virtual address and provides said corresponding physical address and said corresponding byte order format.

10. The system as recited in claim 9 wherein said page attribute table is programmable.

11. The system as recited in claim 9 wherein said byte order format is either a bigendian format or a littleendian format.

12. The system as recited in claim 9 wherein said portion of said attribute bits includes a first bit, a second bit, and a third bit.

13. The system as recited in claim 12 wherein said first bit is a PATi (page attribute table index) bit, wherein said second bit is a PCD (page-level cache disable) bit, and wherein said third bit is a PWT (page-level write-through) bit.

14. The system as recited in claim 9 wherein each entry of said TLB further includes a corresponding effective memory type determined using said memory type selected from said page attribute table, wherein said translation lookaside buffer (TLB) further provides said corresponding effective memory type in response to said virtual address.

15. A system comprising:
a memory type and range register (MTRR) configured to indicate a memory type and a byte order format for a range of physical addresses, wherein said memory type and range register (MTRR) receives a physical address and provides a corresponding memory type and a corresponding byte order format; and
a translation lookaside buffer (TLB) having a plurality of entries, wherein each entry includes a corresponding virtual address, a corresponding physical address, and a corresponding byte order format provided by said memory type and range register (MTRR), wherein said translation lookaside buffer (TLB) receives a virtual address and provides said corresponding physical address and said corresponding byte order format.

16. The system as recited in claim 15 wherein said memory type and range register (MTRR) is programmable.

17. The system as recited in claim 15 wherein said byte order format is either a bigendian format or a littleendian format.

18. The system as recited in claim 15 wherein each entry of said TLB further includes a corresponding effective memory type determined using said memory type provided by said memory type and range register (MTRR), wherein said translation lookaside buffer (TLB) further provides said corresponding effective memory type in response to said virtual address.

19. A method of filling a translation lookaside buffer (TLB), said method comprising:
    translating a virtual address to a physical address, wherein a plurality of attribute bits and a respective virtual address are associated with said physical address;
    using a portion of said attribute bits to select an entry in a page attribute table, wherein said entry indicates a memory type and a byte order format for said physical address; and
    filling an entry of said TLB with said virtual address, said corresponding physical address, and said corresponding byte order format selected from said page attribute table.

20. The method as recited in claim 19 wherein said page attribute table is programmable.

21. The method as recited in claim 19 wherein said byte order format is either a bigendian format or a littleendian format.

22. The method as recited in claim 19 wherein said portion of said attribute bits includes a first bit, a second bit, and a third bit.

23. The method as recited in claim 22 wherein said first bit is a PATi (page attribute table index) bit, wherein said second bit is a PCD (page-level cache disable) bit, and wherein said third bit is a PWT (page-level write-through) bit.

24. The method as recited in claim 19 further comprising:
    determining a corresponding effective memory type using said memory type selected from said page attribute table; and
    filling said entry of said TLB with said corresponding effective memory type.

25. A method of filling a translation lookaside buffer (TLB), said method comprising:
    translating a virtual address to a physical address;
    using said physical address to obtain a memory type and a byte order format from a memory type and range register (MTRR); and
    filling an entry of said TLB with said virtual address, said corresponding physical address, and said corresponding byte order format obtained from said memory type and range register (MTRR).

26. The method as recited in claim 25 wherein said memory type and range register (MTRR) is programmable.

27. The method as recited in claim 25 wherein said byte order format is either a bigendian format or a littleendian format.

28. The method as recited in claim 25 further comprising:
    determining a corresponding effective memory type using said memory type obtained from said memory type and range register (MTRR); and
    filling said entry of said TLB with said corresponding effective memory type.

* * * * *